April 5, 1966 SYDNEY S. HUANG 3,244,202

WIRE WRAPPING DEVICES

Filed Dec. 5, 1963

INVENTOR
SYDNEY S. HUANG

BY Ralph C. Dustin

ATTORNEY

United States Patent Office 3,244,202

Patented Apr. 5, 1966

3,244,202

WIRE WRAPPING DEVICES

Sydney S. Huang, Wappingers Falls, N.Y., assignor to International Business Machines Corporation, New York, N.Y., a corporation of New York Filed Dec. 5, 1963, Ser. No. 328,406
4 Claims. (Cl. 140—124)

This invention is directed to wire wrapping devices, and more particularly to devices for wrapping the end portion of an electrical conductor about a terminal in helical fashion for connecting it thereto.

The connecting of the end portion of an electrical conductor, such as wire, to a terminal is quickly and economically accomplished by means of a wire wrapping device. Since electrical terminals are usually exposed to corroding gases, such as hydrogen sulphide, it is essential that the wire be engaged with the terminal under sufficient pressure to effect a gas tight seal at their engaging surfaces. It is also desirable that the portion of the wire wrapped about each terminal be of uniform length and that the end of this portion be bent into close engagement with the terminal to prevent possible shortening with other wires. A short insulated portion of the wire is desirably wrapped about the terminal first to provide stress relief at the point where the stripped wire first contacts the terminal.

As the end portion of the wire is transported through the bit and wrapped into helical turns about the terminal, it is important that no sharp bends be made in the wire since the stress concentrations introduced thereby result in making the wire brittle throughout its cross section, and this is not desired. On the other hand, uniform, controlled, strain hardening (cold work) of low yield strength copper wire is generally beneficial and necessary to increase the yield strength of the wire. A high connection "strip force" produced by stresses during wrapping is regarded as one of the indirect criteria for good mechanical and electrical stability of the wrapped connection. Present and future trends in connecting devices are toward ever-increasing miniaturization. The problem of the formation of adequate areas of gas tight contact in the wire wrapped connection, as wire and terminal dimensions are drastically reduced, requires that the wire be severely cold work and plastically deformed to produce large areas of contact in the region of engagement of the wire and the surface of the terminal. One characteristic of the wire wrapped connection is that solid state diffusion takes place between conductor and terminal materials resulting in improved connection reliability with time. Diffusion is believed to occur mainly along lattice imperfections. Plastic deformation of a metal can be produced by cold working, and this cold working increases the number of imperfections in the crystal lattice by fragmentation and reduction of grain size, and by distortions of the crystal lattice. Diffusion therefore occurs faster in cold worked than in annealed strain free metals. The highly complex computer systems of today require the highest surface contact and connection reliability which is achievable with a maximum packaging density. Precious metals are used very often in terminals. A means of "flattening" the wire used in making the individual turns of a wire wrapped connection as the wrapping process takes place, to reduce the axial length of the total connection has economic and packaging benefits, resulting from the use of a shorter terminal. Also, with the close tolerances and spacing required in automatic wire wrapping machines, the use of as short a terminal as possible assists greatly in reducing the problem of locating the wrapping bit over the end of the terminal. This compression of the axial length of the wrapped connection and other advantages obtained by alterning the cross-section of the wire is achieved by a wrapping device which produces uniformly controlled cold working which results in the desired plastic deformation and extrusion which are valuable characteristics of this invention.

An object of this invention is to provide an improved wire wrapping device which is capable of formng connections of high mechanical and electrical reliability on hard metal pins.

Another object is to provide an improved device which wraps the end of a wire in helical turns about a terminal so as to effect a gas tight engagement between the wire and the surface of the terminal.

Yet another object is to provide an improved wire wrapping device through which the wire is transported to a shaping portion without subjecting the wire to sharp bends.

Still another object is to provide a wire wrapping device in which the end portion of a wire is cut to uniform predetermined length and then wrapped about a terminal in gas tight relation, said device having means for bending the end of the portion into close engagement with the terminal to prevent a possible shorting contact with other wires.

Another object is to provide an improved wire wrapping device which is operable to wrap a partial turn of insulated wire about a terminal prior to wrapping turns of a stripped portion of the wire about the same terminal.

Still another object is to provide an improved wire wrapping device which is capable of wrapping wire of different sizes about a terminal.

The foregoing and other objects, features and advantages of the invention will be apparent from the following more particular description of a preferred embodiment of the invention as illustrated in the accompanying drawings.

A preferred form of the invention comprises a stationary tubular shaped member in which a shaft or bit is rotatably supported. One end of the bit extends to a point flush with an open end of the tubular member and has an axial opening adapted to receive a terminal about which one end of a wire is to be wrapped. A slot is formed longitudinally of the bit in its outer surface and extends from the working end of the tool to a point underlying an opening in the tubular member. The stripped end portion of a wire is extended from the working end of the bit through the slot and the opening in the tubular member to effect a cutting of the end portion to a uniform length from the insulated portion as the bit starts rotating within the tubular member. Formed in the working end of the bit is a recess of frusto-conical shaped except along the side adjacent the slot. This side is cut back more deeply to provide both a working edge for shaping the wire about the terminal and a gradually inclined surface over which the wire is directed to the working edge.

Figure 1:
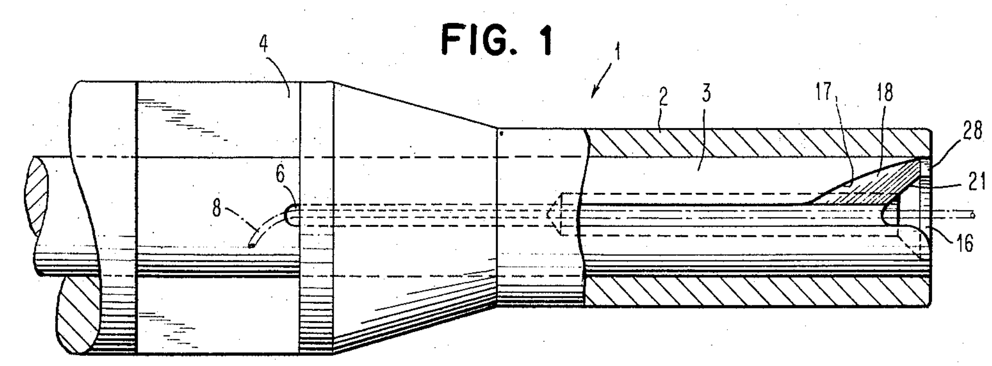
FIG. 1 is an enlarged plan view of the improved wire wrapping bit with a portion cut away to facilitate illustration.

Referring to the drawings it will be noted that there is shown an improved wire wrapping tool, generally designated 1, comprising a tubular or sleeve shaped member 2 having a rod-like bit 3 rotatably contained within it. The member 2 may be connected by any suitable means, not shown, to either the housing or other stationary part of a motor having a rotor to which the bit 3 may be releasably connected. The working end of the bit (right hand end as shown in the drawings) extends to a point flush with an open end of the member 2. Formed in the member 2 at a point spaced from its open end is an opening 4 having the surface around it shaped to provide a cutting edge 5. In the outer surface of the bit between its working end and a point underlying the opening 4 is a slot 6 for receiving the stripped portion of a wire 8 to be wrapped about a terminal 10.

Figure 2:
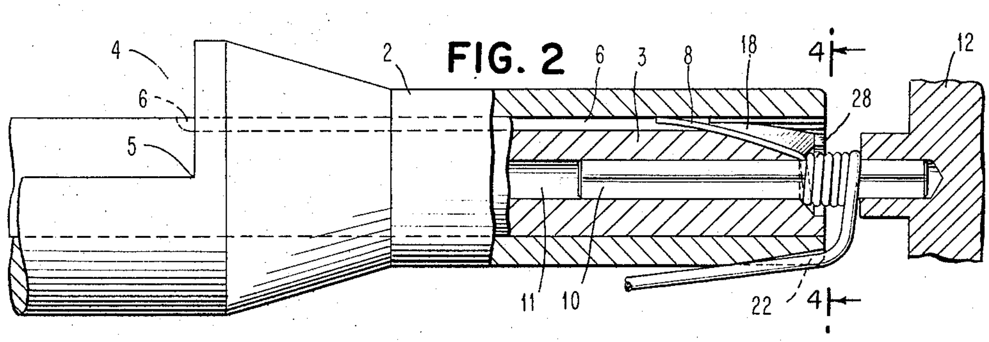
FIG. 2 is a vertical sectional view of the bit shown in FIG. 1 with a terminal in position to have wire wrapped about it.
Figure 3:
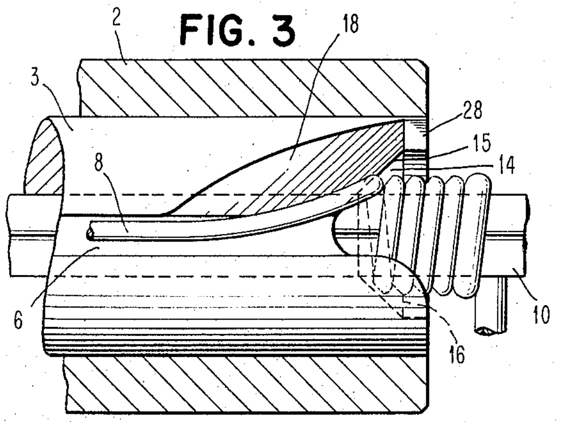
FIG. 3 is an enlarged view taken in the same plane as FIG. 1 and showing the working end of the bit operating to wrap turns of wire about the terminal.
Figure 4:
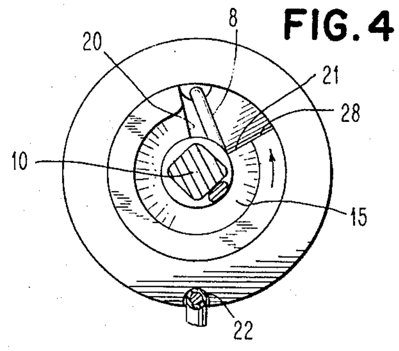
FIG. 4 is a view looking at the end of the bit and taken on the plane of the line 4—4 in FIG. 3.

Extending axially into the bit 3 from its working end is a bore 11 which receives the terminal 10 with a loose rotating fit. As shown in FIG. 4, this terminal is of a rectangular shape in cross section except that its corners are slightly rounded. Such terminals are provided for the making of electrical connections and may be supported by a plate or frame member 12 as shown in FIG. 2. The base of the terminal is firmly fixed within the plate 12 so it is held against rotation, and electrical connections, not shown, may be made through the plate to the terminals.

Formed in the working end of the bit in axial alignment with the bore 11 is a conical shaped recess 14. The surface 15 bounding this recess terminates at one edge in the surface of an enlarged bore 16 extending inwardly only a short distance from the end of the bit. Another edge is formed by the intersection of surface 15 with the surface surrounding the bore 11. A portion of the bit between the bore 11 and the slot 6 is cut away at 17 to form a surface 18 which slopes from the slot 6 toward the axis of the bore 11, as shown in FIG. 2. This surface also slopes from a radial line 20 (FIG. 4) forwardly and to the right so as to form an edge 21 along the portion of its interception with the surface 15.

Figure 6:
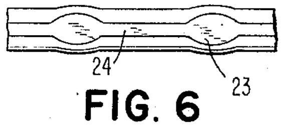
FIG. 6 is an enlarged view of a section of wire stripped from a terminal and showing the contour of the wire surface which engaged the terminal.
Figure 5:
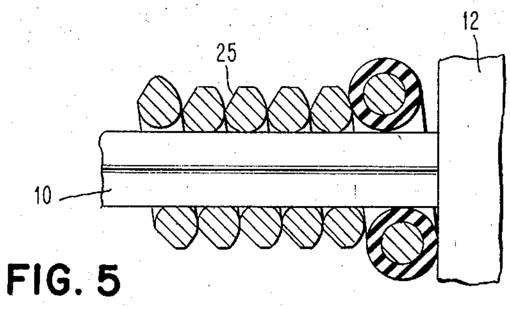
FIG. 5 is an enlarged longitudinal sectional view of a terminal portion with turns of wire wrapped about it by the improved wrapping bit.

Before operating the bit, the stripped portion of the wire is inserted through the slot 6 until its end extends through the opening 4 and an insulated portion of the wire lies within the space overlying the surface 18 at the forward end of the slot 6. The insulated wire is then directed downwardly and rearwardly through a notch 22 in the sleeve 2 so it is held stationary when the bit rotates. The bit is then placed in a position with the terminal 10 extending into the bore 11 and with the wire 8 passing over the surface 18 and downwardly in back of the terminal 10 as shown in FIG. 2. While the tool is held in this position with a light yielding force, the bit is caused to rotate within the tubular member 2 in a counterclockwise direction as viewed in FIG. 4. At the beginning of bit rotation, the end of the wire extending through the opening 4 is cut off by the edge 5 so that a uniform length of wire remains for wrapping about the terminal. Continued rotation of the bit results first in a wrapping of the insulated wire portion over surface 18 about the terminal and then a movement of the stripped wire between the terminal and the edge 21 so the latter acts to wrap the wire about the terminal 10 and, in doing so, to pull the remaining portion of the wire through the slot 6. The angle formed by the edge 21 relative to the axis of the bit is such as to press the wire against the terminal 10 with sufficient force to cause the wire to be deformed in cross section and, in effect, cause an extruding of the wire about the terminal, thereby producing work hardening of the wire. It will be noted in FIG. 5 that the wire is flattened to some extent along its surface engaging the terminal. Since the radial clearance between the edge 21 and the corners of the terminal is less than the clearance between this edge and the sides of the terminal, the surface contact of the wire with the corner portions is somewhat greater than it is with the side portions. The variation in surface contact is indicated by FIG. 6. If the wire was stripped from a terminal after it had been wrapped by the bit described, it would be found that the portions engaging the corners would be flattened as shown at 23 while the portions along the sides of the terminal would be flattened as at 24. Contact between the wire and the terminal along the full length of the wrapped portion is so tight that no corrosion takes place over the contacting surfaces when subjected to a corroding gas. Pressure exerted on the wire by the edge 21 causes a flattening of the wire at 25. This pressure assures a close wrapping of each turn against the preceding turn and an increase in the number of turns per inch. Shorter terminals may be used and still obtain good connections.

As the turns of wire are formed on the terminal and the end of the wire approaches the face of the bit, the wire end tends to move to a position extending radially of the terminal. Referring to FIG. 2 it will be noted that the wire in the position shown is still held by the slot 6 and the inner surface of the tubular member 2 against the edge 21. Further movement of the wire end toward the bit face results in a swinging of the wire away from the surface 18 a distance which is limited by engagement of the wire with the member 2. After the wire has been wound to a point in which it is no longer held by the sleeve surface, it then extends radially of the bit. As the end of the bit is cut away at 17, there is formed on the bit portion surrounding the enlarged bore 16 a surface 28 extending parallel to the axis of the bit as far as the forward end of the edge 21. When the end portion of the wire moves to a position extending radially of the bit, it escapes the forming portion of the edge 21 but is picked up by the surface 28 and bent into a position close to the terminal.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. A tool for wrapping wire in helical turns about a terminal comprising, in combination:
- a tubular member open at one end;
- an elongated bit rotatably supported in said tubular member and having a working portion extending to a point adjacent said open end;
- means defining a wire-receiving slot in the periphery of said bit extending longitudinally of the latter from said working portion;
- said bit having a bore extending axially through said working portion for receiving a terminal;
- a first surface sloping radially outward from said bore toward the end of said working portion;
- a second surface sloping from said slot inwardly to intersect said first surface and form with the latter a working edge over which the wire is guided, said edge acting to force said wire throughout its length into surface contact with said terminal.

2. The tool of claim 1 in which said second surface intersects said first surface at one side of said bore and forms an edge sloping from said bore radially outward toward the end of said working portion.

3. The tool of claim 1 in which said edge forms such an angle with the axis of said bit as to effect an extruding of wire about a terminal extending into said bore when the bit is rotated, said edge also acting to effect a compacting of turns by the wire wrapped.

4. A wire wrapping tool comprising, in combination:
- a tubular member open at one end;

an elongated bit rotatably supported in said tubular member and having a working portion lying adjacent said open end;

means defining a wire-receiving slot in the periphery of said bit extending longitudinally of the latter from said working portion;

said bit having a bore extending axially through said working portion for receiving a terminal;

means defining on said bit a sharp working edge sloping from said bore radially outward toward the end of said working portion;

and means forming a space through which wire may pass from said slot to said working edge without making sharp bends.

References Cited by the Examiner

UNITED STATES PATENTS

| | | | |
|---|---|---|---|
| 2,743,502 | 5/1956 | Reck | 140—122 |
| 2,758,797 | 8/1956 | Miklean | 242—7 |
| 2,926,859 | 3/1960 | Bos et al. | 242—7 |
| 3,117,736 | 1/1964 | Loy et al. | 242—7 |
| 3,143,307 | 8/1964 | Baker | 140—124 |

OTHER REFERENCES

"Wire Wrapping Bit," IBM Technical Disclosure Bulletin, vol. 5, No. 10, March 1963, pages 11 and 12.

RICHARD J. HERBST, *Primary Examiner.*